May 22, 1956 R. A. BAUM 2,746,605
TREATMENT OF LIQUIDS BY MEANS OF DISSOLVED GASES
Filed March 13, 1952 2 Sheets-Sheet 1
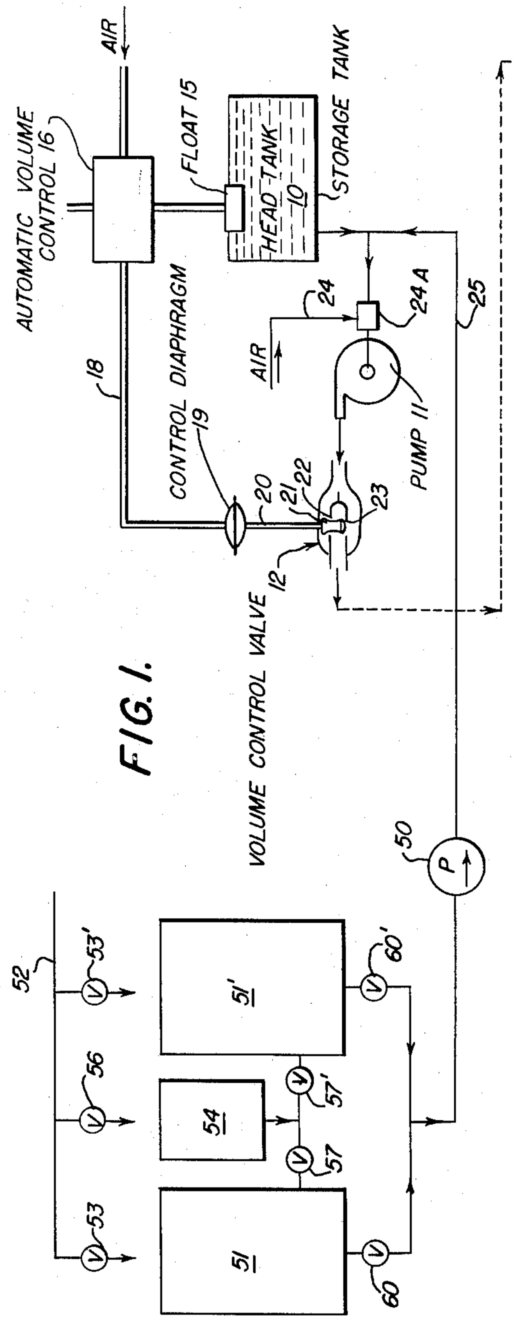
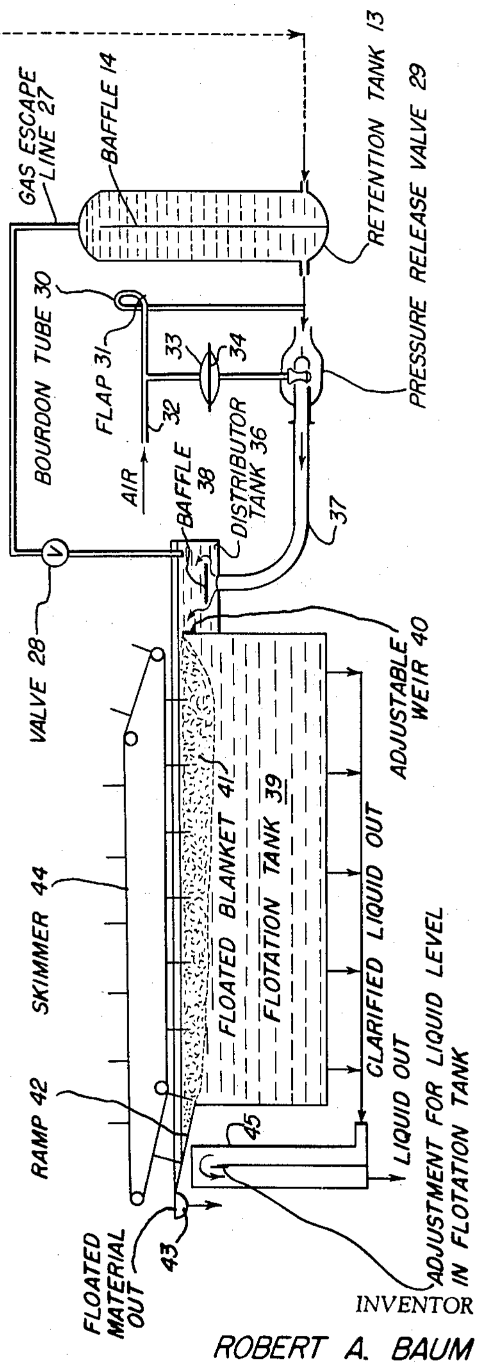
INVENTOR
ROBERT A. BAUM May 22, 1956 R. A. BAUM 2,746,605
TREATMENT OF LIQUIDS BY MEANS OF DISSOLVED GASES
Filed March 13, 1952 2 Sheets-Sheet 2
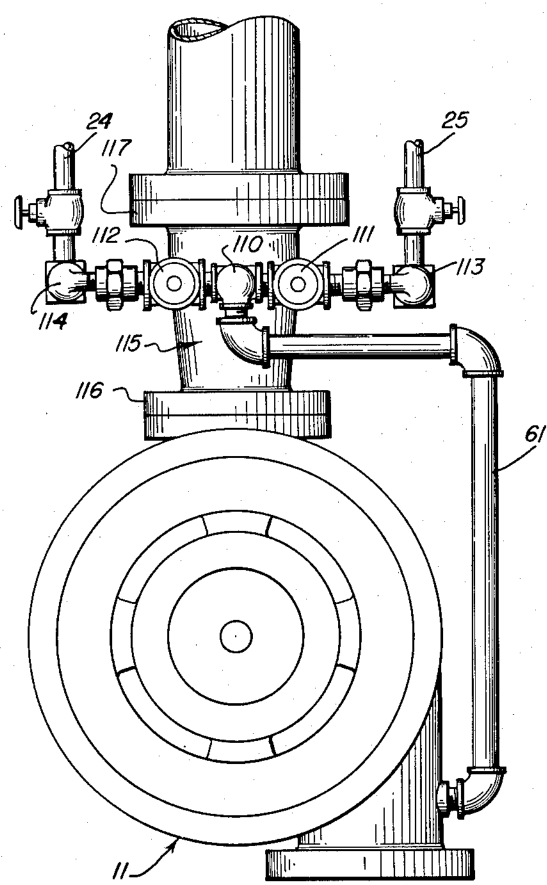
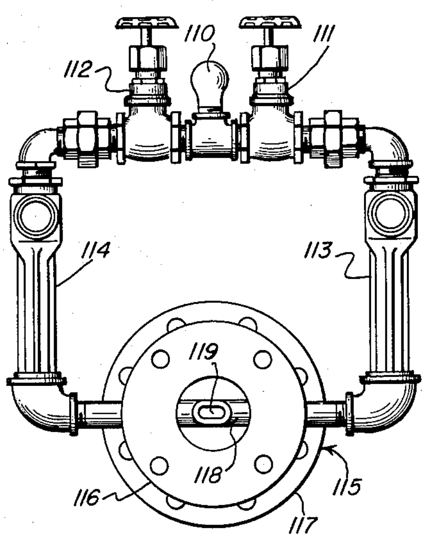
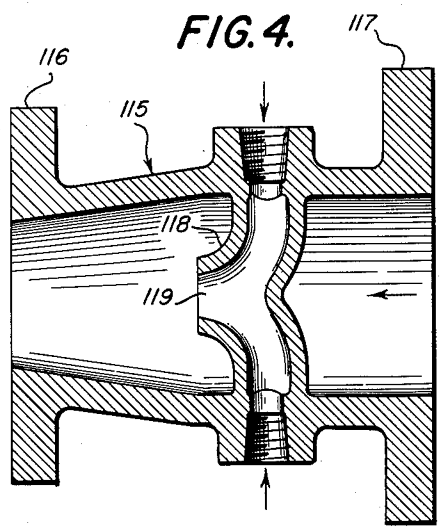
INVENTOR
ROBERT A. BAUM 2,746,605

TREATMENT OF LIQUIDS BY MEANS OF DISSOLVED GASES

Robert A. Baum, Yonkers, N. Y.

Application March 13, 1952, Serial No. 276,284

3 Claims. (Cl. 210—53)

This invention relates to improvements in the dissolving of gases in liquids, and particularly in the utilization of dissolved gases in separation of suspensions by flocculation and flotation.

The present application is a continuation-in-part of Baum application Serial No. 157,700, filed April 24, 1950, for improvements in Flotation, now abandoned. There is described in that application a flotation system applicable to a variety of wastes and other influents, and including an apparatus and method for dissolving gas in the influent, which is also disclosed herein. The present application is directed more particularly to the part of the system concerned with the solution of gas in the liquid being treated, and with the introduction of a flocculant or other treatment chemical.

It is an object of the invention to provide an improved method and apparatus for dissolving gas in liquids.

It is a further object of the invention to provide an improved method and apparatus for flocculating suspensions and separating out suspended materials by flotation.

Several examples of the use of the method and apparatus of the invention will be described with reference to the accompanying drawing, and the features forming the invention will then be pointed out in the appended claims.

In the drawing:

Figure 1 is a schematic view illustrating the invention in a preferred form;

Figure 2 is a plan view of a portion of the equipment of Figure 1;

Figure 3 is an end elevation view of a mixer unit forming part of Figure 2; and

Figure 4 is a horizontal section through an element of Figures 2 and 3 by means of which a chemical and air laden stream is incorporated in the influent.

*Flotation system in general*

The influent or liquid suspension to be treated may be supplied at a regulated rate from a storage tank 10 by means of a pump 11 and volume control valve 12, from which the liquid passes into a retention or dwell tank 13 of upwardly elongated form and divided by a central baffle 14 extending from its bottom to a point near its top. The rate of supply of influent may be regulated as by means of the float 15 and automatic volume control 16, controlling, by means of compressed air through a connection 18, an automatic valve of the familiar double parabolic diaphragm type and having an air diaphragm 19 for moving a valve stem 20, carrying the generally dumbell-shaped valve body 21, so as to vary the flow area through the ports 22 and 23 associated therewith.

Air (or other gas) and flocculant (or other chemical) are introduced through lines 24 and 25 in the mixing unit, indicates schematically at 24–A and described in detail below.

The liquid within the retention tank 13 is maintained at a desired pressure, typically about 25 pounds above atmospheric, and excess gas or air is vented from the gas escape line 27 at the top of the tank under control of the automatic or manually regulated valve 28. The liquid passes from the retention tank through a pressure release valve 29, also of the double parabolic air diaphragm operated type, this valve being controlled so as to maintain constant outlet pressure from the retention tank 13 by means of the Bourdon tube 30 having a flap 31 for regulating escape of compressed air from a line 32, which line is also connected to the casing 33 of the valve diaphragm 34. This control arrangement, which in itself is of usual type, operates to maintain a steady outlet pressure from the retention tank. The liquid passes from the valve 29 through a conduit 37 into a shallow inlet or distributor tank 36 under a baffle 38 to avoid undue agitation and then flows into a flotation tank 39 over an adjustable weir 40. The floated material 41 is removed from the tank up the inclined ramp 42, ultimately passing into an outlet gutter 43, the movement along the flotation tank being accomplished progressively and steadily by means of a skimmer 44, consisting of endless conveyors carrying a number of paddles, as indicated. The clarified liquid is removed progressively through a number of outlets and passes out through a chamber 45 which contains a weir of adjustable height so as to permit adjusting the level in the flotation tank 39 as may be desired.

The system as thus far described, is generally applicable for flotation of various types with or without the addition of coagulants or other treatment chemicals. Reference may be made to the above-mentioned application for further details of interest as to various parts of the system. The present application, however, is concerned particularly with features having to do with the air or other floating gas and with the treatment chemicals and with the manner in which these are added and their action is correlated. These will now be discussed in some detail.

*Air or gas dissolving system*

The arrangements for introducing the air and chemical indicated generally at 24–A in Figure 1 are shown in detail in Figures 2, 3 and 4. Liquid from the high pressure or discharge side of the centrifugal pump 11 is led back through a pipe 61 to a T 110 and through valves 111 and 112 into two branches containing the injectors 113 and 114 from which, in turn, connection is made to a mixer fitting 115 through which the influent passes to the pump 11. The mixer 115 comprises a casting or pipe section having flanges 116 and 117 for attachment to the centrifugal pump inlet and to the influent supply line and a cross piece 118 having passages for receiving the flow from the injectors 113 and 114, which come together and terminate in an outlet nozzle 119 located centrally of the fitting 115 and in a position to discharge liquid supplied from the injectors 113 and 114 into the center of the influent stream through the mixer 115.

The injectors 113 and 114 are of well known commercially available type, having a suitable throat through which the liquid passes and entrains or pumps in the air or chemical solution as the case may be. The air supply line 24 is connected to the injector 114 and the chemical solution line 25 is connected to the injector 113, as indicated in Figure 2, the flow through both lines being regulated as desired by means of valves and the flow of liquid from line 61 through the injectors being similarly regulated by valves 111 and 112.

For best results, rather close attention should be paid to the precise operation obtained in the various parts of the air and chemical mixing system, and the action to be obtained will be discussed in some detail in connection with specific examples of the use of the apparatus and method of the invention.

The action with respect to the air includes first the mixing together of the aspirated air in the injector 114 with the entraining liquid as it passes through the injector. For best results, the proportion of air introduced to the liquid passing through the injector should be rather high, equal volumes or thereabouts being suitable. The injector churns the air and liquid together, producing a fine mist or mixture of air bubbles and liquid drops, which mixture is delivered through the nozzle 119 into the center of the stream of liquid flowing through the fitting 115 to the pump 11. The areas of flow are so related that the cross sectional area within the fitting 115 just past the nozzle 119 is substantially equal to the area for flow around the cross piece 118 plus the flow area through the nozzle 119, or even somewhat greater than these combined areas. By proper regulation of the valves, it is then possible to introduce the mixed air and water through the nozzle 119 into the center of the influent flow through fitting 115 and at substantially the same pressure and velocity as that of the influent surrounding the nozzle 119. The cross piece 118 is preferably placed horizontally as shown, so that any tendency of the air and liquid passing out of the nozzle 119 to flow into low pressure areas or vortices created in the influent by its passage around the cross piece 118 will cause merely flow horizontally outward from the center of the stream, as opposed to permitting the air to rise to the top of the pipe to collect in pockets. The fitting 115 is connected close to the eye or inlet of the pump 11, being only a foot or two away from the eye of the pump, so that the stream delivered from the nozzle 119 will reach the eye of the pump while still substantially in the center of the influent flow into the pump. Within the pump, the aerated liquid from nozzle 119 and the influent generally are churned together and the liquid and air from the nozzle 119 are dispersed thoroughly through and mixed with the influent throughout. The thoroughly dispersed mixture now passes into the dwell or retention tank 13, which is maintained under pressure. The pressure in the tank 13 is maintained at a sufficient value above atmospheric (or above the pressure in the flotation tank, if other than atmospheric) so as to drive sufficient air into solution as to saturate it with dissolved air, at atmospheric or other flotation tank pressure. A pressure of the order of 25 pounds per square inch above atmospheric will ordinarily be found sufficient, but higher pressures may be utilized wherever the nature of the liquid and the gas and the particular application require such higher pressure. The height and cross sectional area of the retention tank 13 are selected so that the time of passage of the influent through this tank will be such as to permit the venting of undissolved air bubbles and the driving into solution of sufficient air as to produce the air saturated influent. A time of passage of the order of a minute or two will ordinarily be suitable. It will be noted that the influent will pass over the top of the weir in a relatively shallow stream, thus facilitating the removal of excess air left in the form of insoluble bubbles.

The system for aerating or dissolving gas in the liquid may be employed in a variety of fields. For example, it may be desired merely to aerate water or other influent for the purpose of purifying it, or to dissolve any of a variety of gases in any of a variety of liquids for promoting or inhibiting various chemical or bacteriological reactions. In such applications, the speed of the centrifugal pump 11 will not be found critical, provided the speed is sufficient to obtain the desired solution of air or other gas in the liquid. In other applications, as indicated below, the speed of the pump 11 should be held within fairly narrow limits for best results. These limits are dictated on the one hand by the need for complete dispersion of the gas within the liquid, which dispersion will not be obtained with satisfactory thoroughness below a certain pump speed, and by the need for avoiding homogenization or excessive dispersion of suspended liquids or solids, which may occur at excessive pump speeds.

*Chemical dispensing system*

While the invention is applicable in its broader aspect to the mere dissolving of gases in liquids, it is concerned in its narrower aspect also with the dispersion into the liquid of a flocculant or other treatment chemical. Such chemical is, as indicated above, aspirated into the injector 113 through the line 25 and is also delivered to the cross piece 118 of the fitting 115, merging together with the air or gas laden stream from the injector 114 and passing therewith centrally of the influent stream into the eye of the impeller. It will be noted that any great dilution of the chemical is avoided until the last possible moment and occurs only within the pump impeller. As will be apparent from the example given below, this is also an important feature of the invention, as complete dispersion of the treatment chemical is obtained while postponing to the last possible moment hydrolysis or other dilution or mixture effects. In this way, the action of the dissolved air or other gas and of the flocculant or other treatment chemical may be correlated for obtaining the most efficient possible combined action.

The chemical supplied through the line 25 may be a liquid or solution in commercially available form, as, for example, aluminum sulphate in suitable concentration, or it may be dissolved or diluted to desired concentration. There is shown schematically in Figure 1 a chemical supply system including a pump 50 for supplying solution at a regulatable rate from either of a pair of tanks 51, 51' under control of outlet valves 60, 60'. These tanks may be supplied with water or other liquid from liquid supply line 52 at rates and in amounts regulated by the valves 53, 53'. Concentrated solution is introduced into the tanks 51, 51' from the concentrated solution or mixing tank 54 at rates and in amounts controlled by the valves 57, 57'. The valve 56 controls the flow of liquid from line 52 into tank 54. While solution is being supplied from tank 51, solution of desired concentration is prepared in tank 51' by admitting concentrated solution from tank 54 and water from line 52, and the supply is switched over to tank 51' as tank 51 nears exhaustion. Repetition of this operation provides a continuous supply of chemical solution of accurately controlled concentration. While simpler systems may be used in many applications, the generally applicable solution system just described has been shown by way of completeness.

As applied to flotation or similar processes, the process of the invention typically involves the treatment of an influent containing colloidal and other suspended material in relatively great dilution, and the removal thereof from the influent liquid by coagulation or flocculation together with flotation by means of dissolved gas. The object to be achieved by the process may, of course, be primarily purification or clarification of the influent liquid to produce an effluent suitable for disposal or suitable for a desired use, or further processing, or may be primarily the recovery of the suspended materials, or both objects may be present in varying degrees of importance.

The treatment of meat packing plant wastes illustrates the operation of the invention very satisfactorily in most particulars.

*Treatment of meat packing plant wastes*

A detailed description will now be given by way of example of the application of the apparatus and process of the invention to the treatment of meat packing plant wastes, and typically such wastes as resulting from the processing of hogs. In a typical operation, about 500 gallons of water may be used per animal, producing an influent having approximately a thousand parts per million grease content and a somewhat greater content of suspended solids. The grease is present in varying percentages as free grease in relatively large globules, and in various degrees of dispersion into particles ranging down to emulsions of colloidal character. The suspended solids are largely albuminoids and other blood serum colloids as well as miscellaneous fibrous materials.

In a particular example, treatment by means of catch basins in the usual way had resulted in a percentage of grease recovery of around 30% and a somewhat less efficiency in the recovery of suspended solids. Due to the small percentage of grease recovery, the effluent contained an objectionable percentage of grease from the standpoint of sewerage disposal. The operation was, of course, influenced very largely by seasonal changes in temperature and other conditions and the time involved in treatment was necessarily so long as to result in considerable and objectionable bacterial action and decomposition.

Treatment of this waste by the system of the invention resulted in a marked improvement. Under the plant operating conditions, the daily waste treatment covered a period of about nine hours, the equipment being cleaned in readiness for reoperation daily. Samples taken and analyzed for a day's operation, involving the treatment of 286,000 gallons (2,375,000 lbs.) of influent at an average rate of about 530 gallons per minute, indicated an efficiency of grease recovery of 92% and of suspended solids recovery of 89%. The influent was found to contain 1,616 p. p. m. grease (3,846 lbs.) and 2,546 p. p. m. suspended solids (6,110 lbs.). The grease content and solids content of the effluent were reduced respectively to 131 p. p. m. and 287 p. p. m., a very satisfactory reduction for disposal purposes, while the percentage of recovery was, as indicated above, very high and in the neighborhood of 90%. The entire operation proceeded so rapidly as to hold undesirable bacterial action and decomposition down to a negligible level.

The flocculating agent used was the trivalent aluminum ion supplied by means of aluminum sulphate, as usual, this being the most convenient and economical flocculant for the purpose. The aluminum sulphate was supplied to the chemical supply line 25 in a concentration of one pound of the aluminum sulphate, expressed as

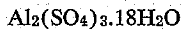

$Al_2(SO_4)_3.18H_2O$ per gallon. In this concentration, the sulphate ion is sufficiently concentrated as to redissolve any aluminum hydroxide floc which may form or tend to form. The same was true of the preliminarily diluted aluminum sulphate solution supplied to the mixer 115 from the injector 113, so that floc formation prior to the admixture of the concentrated solution into the impeller of the pump 11 was prevented. The aluminum sulphate was supplied at a rate of about 120 p. p. m. (expressed as

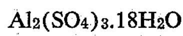

$Al_2(SO_4)_3.18H_2O$ and corresponding to a rate of about 10 p. p. m. expressed as available trivalent aluminum ion), this being an optimum value for the particular application. It is found that about 60 p. p. m. for a waste having a suspended grease and solids content of the concentration indicated is a minimum value for the flocculant, if good results are to be obtained, and a satisfactory percentage of recovery of grease and solids is to be had. For an influent of the concentration indicated, 180 p. p. m. was found to be maximum satisfactory value, increase beyond this value being uneconomical from the standpoint of the cost of the aluminum sulphate as related to the percentage of recovery, and, more importantly, from the standpoint of the treatment of the recovered grease. Use of the flocculant in excessive quantities tends to saponify the grease, forming metallic soaps, and unfitting the recovered suspended materials for treatment by the usual rendering process to recover the grease in commercially usable form. As will be evident, the quantities of grease involved are sufficient to be very important economically, and, in fact, to such an extent as to amortize the cost of the installation very rapidly.

It has been found in the experimental installation, that the system of the present invention is markedly less subject to changes in climatic conditions by reason of the rapidity of operation. Thus, the influent is treated at substantially the temperature at which discharged from the plant, and the entire treatment, accordingly, takes place typically at moderate temperatures considerably below the ambient temperature in summer and considerably above the ambient temperature in winter. While the quantity of air to be supplied to the influent theoretically bears some relationship to the temperature of the influent, by reason of the variation in solubility of the air with temperature, this variation in practice is small and the condiitons obtaining at a temperature of about 68° F. may be taken as typical. Under such conditions, the influent at atmospheric pressure is capable of holding about .02 volume of air in true solution. In order to produce the required finely dispersed bubbles coming out of solution to achieve the flotation, it is necessary to drive an excess quantity of air into solution in the influent. This can be done in a practical and satisfactory manner only by thoroughly dispersing the air into a mixture of colloidal or substantially colloidal character in the influent so as to obtain maximum air-water interface and subjecting the mixture to sufficient pressure for a sufficient length of time so as to drive the desired quantity of air into true solution. In the example mentioned, the influent flowing at an average rate of 530 gallons per minute was capable of taking air into true solution at atmospheric pressure at the rate of slightly less than 1½ cubic feet or about 12 gallons per minute. The air was added at approximately double this rate, or about 25 gallons per minute, corresponding to an amount which could be held in true solution at about 15 pounds above atmospheric pressure. The pressure at the outlet of the pump and in the retention tank was maintained at about twice this value or close to 30 p. s. i. above atmospheric, thus insuring the driving into solution of approximately double the quantity of air which could be held by the influent in true solution at atmospheric pressure. The time required for completion of solution of the air and for the venting of any air bubbles which do not dissolve is about one minute, and the retention tank is, accordingly, dimensioned to pass the liquid at the designed rate of operation in about one to one and a quarter minutes, this time plus the half a minute or so involved in the passage of the air through the injector and piping system to the tank being sufficient to accomplish the solution of the air and not permitting excess premature formation of floc. The discharge valve 29 for the retention tank operates as a pressure release valve, the influent flowing smoothly therethrough so as to cause the least possible formation of air bubbles in the valve. The excess air goes out of solution in the passages to the flotation tank and in the passage of the influent through the tank in a condition of complete dispersion through the influent and appears as colloidal and subcolloidal particles or bubbles. Since .02 air by volume corresponds to about 30 p. p. m. by weight in water, it will be seen that in molecular terms, the air is added in quantities comparable to, and, in fact, somewhat in excess of the rate of addition of the aluminum ion.

While, as pointed out above, in applications where the action involves only the treatment of a liquid by dissolving gas therein, the precise speed of the pump 11 may not be important, a different condition obtains in treatment of liquids by flocculation and flotation. Thus, for most efficient treatment of meat packing plant wastes, taken by way of example, and using a pump with an impeller having one foot diameter, speeds of 1150 R. P. M. and 1750 R. P. M. will be found satisfactory. Materially lower speeds will not obtain the complete dispersion of the air which is necessary to proper solution and proper flotation action, while materially higher speeds will homogenize the influent, materially slowing down and interfering with the flotation process. For this application, therefore, the pump impeller tip speed should be between 3500 and 5500 feet per minute, representing about 22% variation either way from a middle value of 4500 feet per minute. Within the range specified, the pump speed is not found critical and a suitable speed may be selected by a proper combination of commercially available pumps and drive motors.

The speed of flocculation obtained with the system of the invention is quite striking. Where aluminum sulphate is added to water in the usual way in water treatment systems, it is found that the formation of the floc requires about 15 minutes, whereas in the present system, the floc will be found to form in a matter of two minutes or less. This speed of floc formation is partly due to the rapidity of dissolving of the flocculant in the influent by comparison with the methods of solution employed in conventional water treatment. However, even if an allowance of three or four minutes' solution time in such conventional system be made, it will be apparent that the floc formation after the flocculant has been put into solution occurs in about one tenth of the time which might be expected. Since such a rapid floc formation does not occur in the absence of the dissolved air, it seems quite certain that the rapidity of formation is attributable largely to the action of the air as it comes out of solution. The precise mechanism by which this occurs is not known, but it seems reasonable to suppose that the action is probably due to nascent air bubbles, undoubtedly possessing an electric charge, serving as nuclei for formation of the aluminum hydroxide floc and for precipitation of the albuminoids or other colloids of the influent. The action involved may also be due in large part to the destruction of a protective colloid or colloids in the influent mixture. Regardless of the theory on which the effect is explained, is appears that by coordinating the escape of the dissolved air and the formation of the floc, so that these may occur simultaneously, a combined action of markedly greater efficiency than anything known heretofore may be obtained. The high efficiency of recovery is doubtless due in some degree to the simultaneity of the action occurring in all parts of the influent from a starting condition of almost complete dispersion. As is well known, when a precipitation is allowed to occur locally within a liquid, the resulting reduction of concentration may seriously inhibit further precipitation. Such effect does not appear to occur in the process of the invention.

As pointed out above, the sulphate ion serves the useful purpose of preventing premature floc formation, and it may possess some action relation to some of the suspended substances. It is not believed, however, that in the treatment of meat packing plant waste this particular anion has any material effect, either desirable or undesirable, upon the floc formation occurring in the dilute influent. The invention does not exclude, however, the possibility of reaction of a significant character between substances contained in the influent and an anion or other radical associated with the flocculant proper. It is thought that, in view of the known affinity between oxygen and water, on the one hand, and nitrogen and greases, on the other, a nitrogenation of some of the suspended greases may occur under the conditions of complete solution that are obtained, and may be a significant factor in the elimination of such greases.

It has previously been attempted to add alum or other flocculating agent to the liquid to be treated in advance of the aeration of the liquid, as well as to add the flocculating agent to the previously aerated air. For proper operation, however, it is essential that the aeration and flocculant addition be simultaneous or substantially so. If the flocculating agent be added to the liquid in advance of the aeration thereof, the floc will form and will then be sheared and broken up during the aeration process, thus interfering with efficient separation. It will also be found that the air as it comes out of solution in liquid in which the floc has previously been formed will have a less efficient floating action as the floating action will be confined entirely or in large degree to such action as is possible by means of air bubbles clinging to the surface of the floc particles or masses. If, on the other hand, it be attempted to aerate the liquid first and then add the floc to the previously aerated liquid, it will be found, in an installation of any practical size, that there is insufficient time for the floc to form, so that the air will largely be discharged from solution and rise to the surface in the form of ineffective bubbles without accomplishing the desired flotation.

It will be noted that the apparatus and process of the invention provide for the solution of the floc forming material and the air in the influent under conditions such that the influent is delivered to the flotation tank with air and flocculating agent in solution, and without excessive premature formation of floc or formation of air bubbles. In consequence, the formation of the floc and the liberation of the air occur simultaneously and under conditions of the most complete possible dispersion of air and flocculating agent through the liquid. Therefore, as the floc forms, air is released in the form of minute bubbles within the structure of the floc particle itself, producing a particle which is capable of floating rapidly to the surface without assistance from adhering air bubbles. Any adherent air bubbles which are formed will, of course, further assist the action. An efficient means of floating suspended grease and solids either present as suspensions of particles of colloid size or converted into such particles during the flotation is, therefor, provided, the floating particle comprising the floc together with both occluded air and occluded suspended materials.

The radically different character of operation obtained by the method and apparatus of the invention as compared with previous flotation methods will be apparent from a consideration of the mechanism of formation of bubbles of air or other gas in liquids in general. As is well known, gas bubbles formed and persisting in a liquid for any length of time are subject to rather severe limitations as to the size of bubble. Thus, at the bottom of a bath of liquid containing dissolved gas which is coming out of solution, very small bubbles may be formed. As these rise through the liquid, however, they tend to merge into larger and larger bubbles, so that by the time they have reached the surface their size is enormously increased. Since the adhesion of a bubble and a particle to each other is a function of surface area, the flotation efficiency of large bubbles is small by comparison with that of small bubbles and, accordingly, with the process of bubble formation in the usual way in a liquid, flotation efficiency cannot be great. Where, however, the formation of the floc and the coming out of solution of the dissolved gas are permitted to occur simultaneously as in the apparatus and method of the present invention, an entirely different action may be obtained, as an extremely minute nascent bubble trapped in the nascent floc structure becomes stabilized and need not conglomerate into a larger bubble. The minimum size of bubble which can exist in a given liquid under usual conditions is also limited by the inherent physical conditions which obtain, as reduction in bubble size involves a corresponding increase of curvature of the interface between bubble and liquid and a corresponding increase of pressure within the bubble due to surface tension together with an increase of the ratio between the interface area and the volume of the bubble. It accordingly follows that with a given liquid and gas there is a minimum bubble diameter, below which the bubble extinguishes itself, the pressure forces being such as to drive it back into solution. However, when the bubble, simultaneously with its formation, is occluded in the floc while the latter is also being formed, the typical liquid-gas conditions no longer exist, and the minimum size of bubble which may be relatively permanent is dictated by the interface conditions between the bubble and the floc and occluded substances and by the solubility of the bubbles in these materials as distinguished from the liquid in general. It is, therefore, believed that in addition to an improvement in the efficiency obtained by the separation of the air bubbles as formed, from each other by the floc, there is also an improvement in the efficiency obtained due to the possibility of existence within the floc structure of bubbles of smaller size than capable of existence within the liquid in general.

What is claimed is:

1. In a flotation apparatus including means for introducing a gas into a suspension of material in a liquid so as to increase the solubility of the gas in the liquid, and a tank adapted to contain a pool of the liquid into which the pressurized suspension containing the gas is discharged so that the gas comes out of solution and floats the material, the combination which comprises a closed vessel, means for introducing said liquid and gas into said vessel under pressure, means for bleeding undissolved gas from said vessel, a conduit for withdrawing the pressurized suspension and its dissolved gas from said vessel and introducing the material thus withdrawn into said pool, and pressure control means in said conduit arranged to maintain a predetermined pressure in said vessel.

2. Apparatus as defined in claim 1, wherein said last-named means comprise a valve in said conduit and means responsive to the pressure in said vessel for regulating the opening of said valve.

3. In a flotation apparatus including means for introducing a gas into a suspension of material in liquid under pressure so as to increase the solubility of the gas in the liquid, and a tank adapted to contain a pool of the liquid into which the pressurized suspension containing the gas is discharged so that the gas comes out of solution and floats the material, the combination which comprises a closed retention chamber, a baffle in the chamber extending from the bottom to a level just below the top, a conduit for introducing the pressurized suspension containing the gas into a lower part of the chamber on one side of the baffle, means for bleeding off undissolved gas from the chamber above the baffle, a conduit for withdrawing the pressurized suspension containing the dissolved gas from a lower part of the chamber on the other side of the baffle and introducing the suspension thus withdrawn into the pool, a pressure release valve in the conduit, and means responsive to the pressure on the inlet side of the release valve for opening the valve as the pressure increases and closing the valve as the pressure decreases.

References Cited in the file of this patent

UNITED STATES PATENTS

| | | |
|---|---|---|
| 864,856 | Norris | Sept. 3, 1907 |
| 973,992 | Sutro | Oct. 25, 1910 |
| 1,149,045 | Greth et al. | Aug. 3, 1915 |
| 1,717,223 | Karlstrom | June 11, 1929 |
| 1,930,848 | Ashley et al. | Oct. 17, 1933 |
| 2,126,164 | Anderson | Aug. 9, 1938 |
| 2,220,574 | Little et al. | Nov. 5, 1940 |
| 2,237,882 | Lawlor et al. | Apr. 8, 1941 |
| 2,248,177 | Karlstrom | July 8, 1941 |
| 2,287,284 | Behrman | June 23, 1942 |
| 2,330,589 | Juell | Sept. 28, 1943 |
| 2,360,812 | Kelly et al. | Oct. 17, 1944 |
| 2,393,079 | Wall | Jan. 15, 1946 |
| 2,415,491 | Hieger | Feb. 11, 1947 |
| 2,446,655 | Lawrason | Aug. 10, 1948 |
| 2,606,150 | Thorp | Aug. 5, 1952 |

FOREIGN PATENTS

| | | |
|---|---|---|
| 388,962 | France | June 15, 1908 |
| 491,623 | Great Britain | Sept. 7, 1938 |